(12) United States Patent
Anegawa et al.

(10) Patent No.: US 10,894,361 B2
(45) Date of Patent: Jan. 19, 2021

(54) THREE-DIMENSIONAL FORMING APPARATUS AND METHOD OF FORMING THREE-DIMENSIONAL OBJECT

(71) Applicant: Seiko Epson Corporation, Tokyo (JP)

(72) Inventors: Kenta Anegawa, Matsumoto (JP); Daizo Aoyagi, Shiojiri (JP)

(73) Assignee: Seiko Epson Corporation

( * ) Notice: Subject to any disclaimer, the term of this patent is extended or adjusted under 35 U.S.C. 154(b) by 20 days.

(21) Appl. No.: 16/395,421

(22) Filed: Apr. 26, 2019

(65) Prior Publication Data

US 2019/0329495 A1 Oct. 31, 2019

(30) Foreign Application Priority Data

Apr. 27, 2018 (JP) ................. 2018-086843

(51) Int. Cl.
*B33Y 50/02* (2015.01)
*B29C 64/386* (2017.01)

(52) U.S. Cl.
CPC ............ *B29C 64/386* (2017.08); *B33Y 50/02* (2014.12)

(58) Field of Classification Search
CPC ..... B29C 64/386; B29C 64/10; B29C 64/321; B29C 64/393; B29C 64/106; B29C 64/141; B29C 64/153; B29C 64/20; B33Y 50/02; B33Y 10/00; B33Y 30/00
See application file for complete search history.

(56) References Cited

U.S. PATENT DOCUMENTS

| | | | |
|---|---|---|---|
| 9,266,353 B2 * | 2/2016 | Beier ................ | B41J 11/002 |
| 9,975,327 B1 * | 5/2018 | Yang ................. | B41J 2/2132 |
| 2001/0019340 A1 * | 9/2001 | Kubo ................. | B41J 2/01 347/1 |
| 2007/0228592 A1 * | 10/2007 | Dunn ................ | B29C 64/393 264/40.4 |
| 2008/0218542 A1 * | 9/2008 | Tezuka ............... | B41J 3/4073 347/8 |
| 2014/0117575 A1 * | 5/2014 | Kemperle ............ | B29C 64/393 264/40.7 |
| 2015/0352839 A1 * | 12/2015 | Folkins ............... | B29C 64/112 347/14 |
| 2017/0106590 A1 * | 4/2017 | Hakkaku ............. | B29C 64/112 |

FOREIGN PATENT DOCUMENTS

JP 2016-215581 A 12/2016

* cited by examiner

*Primary Examiner* — Christopher E. Everett
(74) *Attorney, Agent, or Firm* — Harness, Dickey & Pierce, P.L.C.

(57) ABSTRACT

A three-dimensional forming apparatus includes: an ejecting portion that ejects a forming material from an opening portion to a forming table; a moving portion that changes a relative position between the forming table and the ejecting portion; and a controller that controls the ejecting portion and the moving portion. The ejecting portion includes a tip surface having the opening portion. An external shape of the opening portion is polygonal. When the three-dimensional object is formed, the controller controls the moving portion such that a distance (Gp) between the tip surface and an estimated position to which the forming material is to be ejected from the ejecting portion satisfies the following Expression (1).

$$(Sq1 \times Gp)/Vt < 1.0 \qquad (1)$$

where $Sq1$ represents an area of the opening portion, and $Vt$ represents a volume of the forming material that is ejected per unit moving amount by the ejecting portion.

7 Claims, 7 Drawing Sheets

FIG. 9
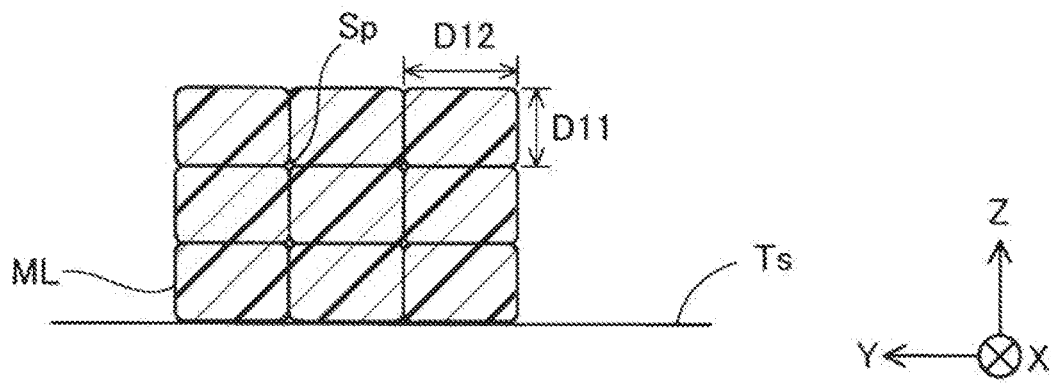
FIG. 10
| SHAPE OF OPENING PORTION | CIRCULAR (DIAMETER 1.0 mm) | | | SQUARE (D1=D2=1.0 mm) | | |
|---|---|---|---|---|---|---|
| DISTANCE Gp | 1.0 | 0.7 | 0.5 | 1.0 | 0.7 | 0.5 |
| POROSITY (%) | 15.80 | 0.96 | 0.81 | 0.06 | 0.03 | 0.41 |
FIG. 11
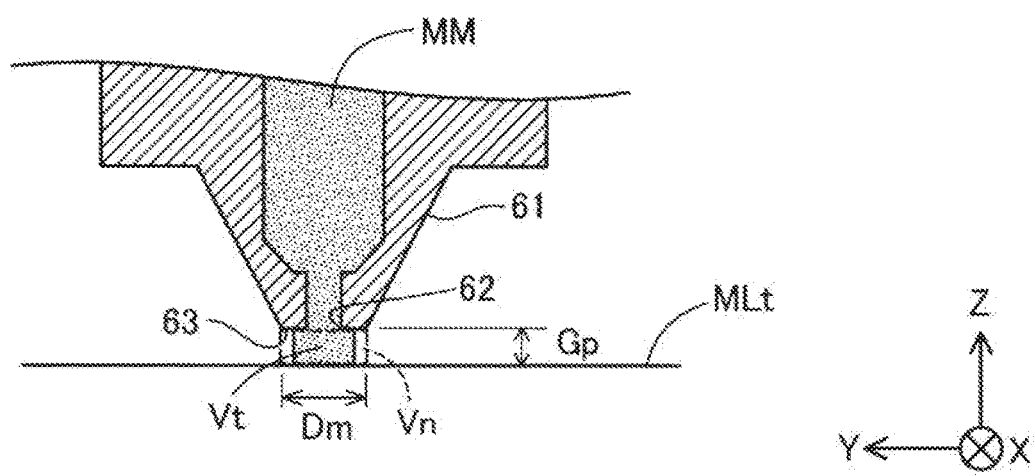

THREE-DIMENSIONAL FORMING APPARATUS AND METHOD OF FORMING THREE-DIMENSIONAL OBJECT

The present application is based on and claims priority from JP Application Serial Number 2018-086843, filed Apr. 27, 2018, the disclosure of which is hereby incorporated by reference herein in its entirety.

BACKGROUND

1. Technical Field

The present disclosure relates to a three-dimensional forming apparatus and a method of forming a three-dimensional object.

2. Related Art

A three-dimensional forming apparatus that disposes a material having fluidity at a desired position to form a three-dimensional object is proposed. In this three-dimensional forming apparatus, for example, an object having a three-dimensional shape is formed in a planar shape by sequentially repeating ejection of a material while shifting a position on a plane. By further ejecting the material on an upper surface of the formed plane to deposit the material in a layer shape, a three-dimensional object is formed. Regarding the three-dimensional forming apparatus, for example, a technique of radially forming plural protrusions in a nozzle hole from which a material is ejected or adopting a polygonal shape having plural corners for a nozzle hole in order to prevent unnecessary forming caused by intermittent ejection of the material from a nozzle is proposed (for example, JP-A-2016-215581).

However, the techniques of devising the shape of the nozzle hole can avoid only unnecessary forming and does not consider the remaining of voids between adjacent materials during formation of a plane. The remaining of excessive voids in a three-dimensional object is not preferable.

SUMMARY

According to an aspect of the present disclosure, a three-dimensional forming apparatus is provided. This three-dimensional forming apparatus includes: an ejecting portion ejecting a forming material from an opening portion to a forming table; a moving portion that changes a relative position between the forming table and the ejecting portion; and a controller that controls the ejecting portion and the moving portion such that a three-dimensional object is formed. The ejecting portion may include a tip surface having the opening portion. An external shape of the opening portion may be polygonal, and when the three-dimensional object is formed, the controller may control the moving portion such that a distance (Gp) between the tip surface and an estimated position to which the forming material is to be ejected from the ejecting portion satisfies the following Expression (1).

$$(Sq1 \times Gp)/Vt < 1.0 \qquad (1)$$

where Sq1 represents an area of the opening portion, and Vt represents a volume of the forming material that is ejected per unit moving amount by the ejecting portion.

BRIEF DESCRIPTION OF THE DRAWINGS

FIG. 9 is a side view schematically illustrating a formed layer that is deposited through the ejection process.

FIG. 10 is a table illustrating experiment data relating to measured porosities of objects formed while changing a distance.

FIG. 11 is a side view illustrating a configuration of a planar portion of the nozzle.

DESCRIPTION OF EXEMPLARY EMBODIMENTS

A. First Embodiment

Figure 1:
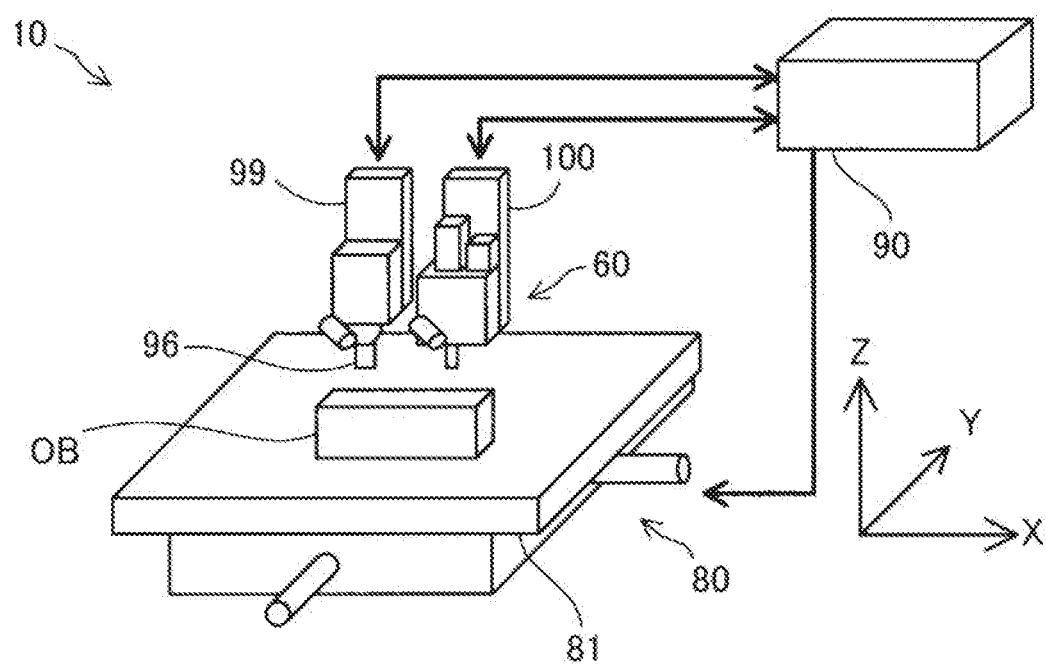
FIG. 1 is a diagram illustrating a schematic configuration of a three-dimensional forming apparatus according to a first embodiment.

FIG. 1 is a diagram illustrating a schematic configuration of a three-dimensional forming apparatus 10 according to a first embodiment. The three-dimensional forming apparatus 10 according to the embodiment includes a controller 90, a forming table 81, a moving mechanism 80, a three-dimensional forming unit 100, and a cutting unit 99. Hereinafter, "three-dimensional forming unit" will also be simply referred to as "forming unit", and "three-dimensional object" will also be simply referred to as "object".

The three-dimensional forming apparatus 10 deposits a forming material on the forming table 81 using the forming unit 100 to form an object, the forming table 81 being moved by the moving mechanism 80. FIG. 1 schematically illustrates a state where an object OB is formed on the forming table 81.

The controller 90 is a control device that controls operations of the forming unit 100, the cutting unit 99, and the moving mechanism 80 such that a forming process of forming an object is executed. The operations include movement of three-dimensional relative positions of the forming unit 100 and the cutting unit 99 to the forming table 81. FIG. 1 illustrate directions of this movement as three directions X, Y, and Z perpendicular to each other. The X direction and the Y direction are horizontal directions, and the Z direction is a direction opposite to the gravity direction. Arrows indicating the X, Y, and Z directions are appropriately illustrated in the other drawings such that the directions illustrated in the drawing correspond to FIG. 1.

In the embodiment, the controller 90 is configured by a computer including one or more processors, a main storage device, and an input/output interface that inputs and outputs a signal to and from an external device. The controller 90 exhibits various functions by the processor executing a program or a command read to the main storage device. Instead being configured by the computer, the controller 90 may be realized by a configuration in which plural circuits for realizing at least a part of the functions are combined.

The forming table 81 is a planar member on which the forming material is deposited. The forming table 81 is disposed at a position facing an ejecting portion 60 of the forming unit 100. The moving mechanism 80 is a moving portion that changes a relative positional relationship between the ejecting portion 60 and the forming table 81 under the control of the controller 90. The moving mechanism 80 is configured by a three-axis positioner that moves the forming table 81 in the three axis directions as the X, Y, and Z directions using driving forces of three motors.

The cutting unit 99 is a cutting device that cuts the object OB by rotating a cutting tool 96 attached to a shaft of a head tip. AS the cutting tool 96, for example, a flat end mill or a ball end mill can be adopted. The cutting unit 99 detects a position of a tip of the cutting tool 96 with a general position detection sensor and transmits the detection result to the controller 90. The controller 90 performs cutting by controlling a relative positional relationship between the cutting tool 96 and the object OB using the moving mechanism 80 described below.

Figure 2:
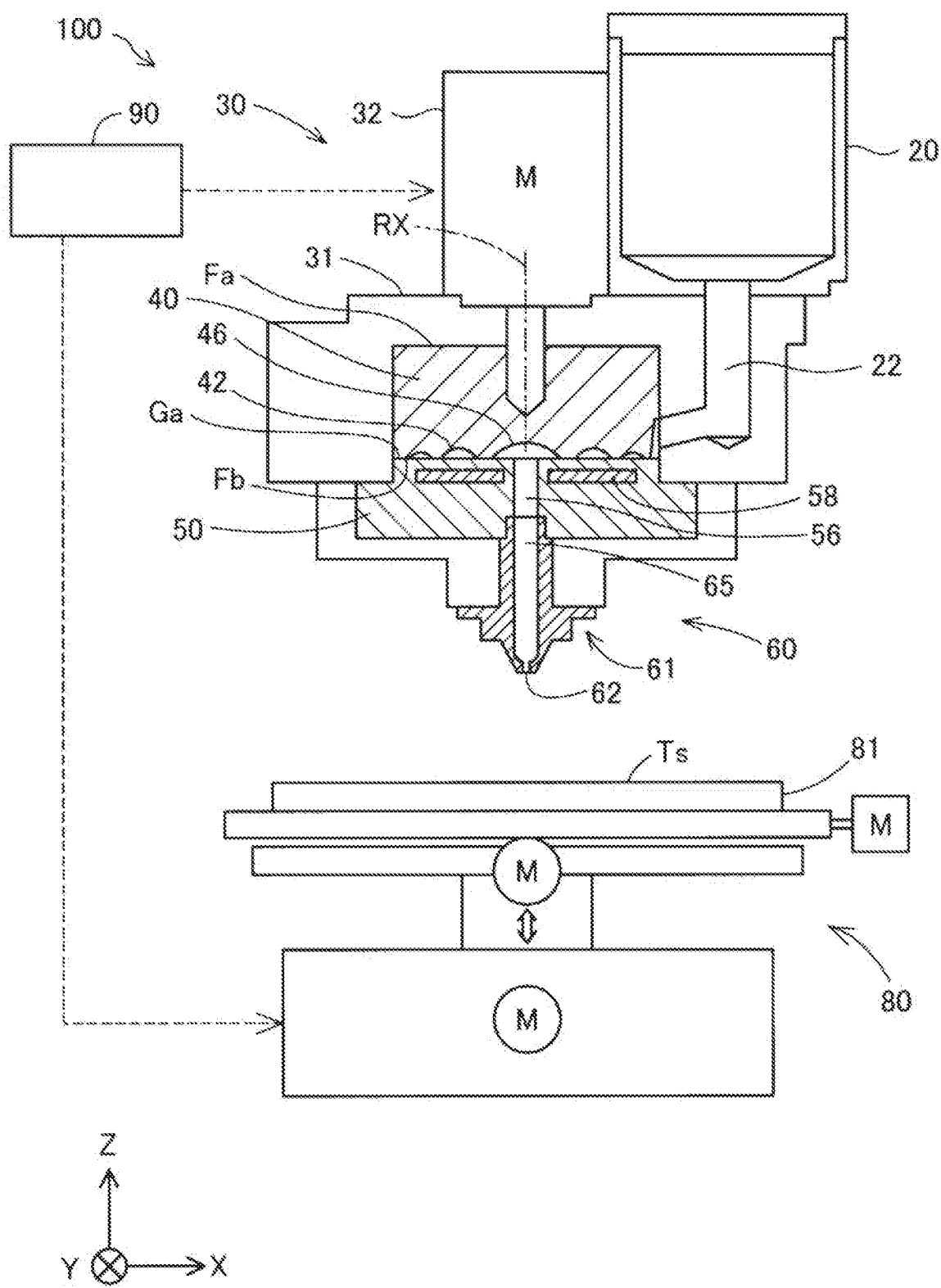
FIG. 2 is a schematic diagram illustrating a configuration of a three-dimensional forming unit.

FIG. 2 is a schematic diagram illustrating the configuration of the forming unit 100 that forms a three-dimensional object in the first embodiment, in which some of the members are illustrated in cross-section. The forming unit 100 melts at least a part of a solid material to produce a paste-form forming material and disposes this forming material on the forming table 81. The forming unit 100 includes a material supply portion 20 and a forming material producing portion 30 in addition to the ejecting portion 60.

The material supply portion 20 supplies a material to the forming material producing portion 30. The material supply portion 20 is configured by, for example, a hopper that accommodates a material. The material supply portion includes a discharge port on a lower side. This discharge port is connected to the forming material producing portion 30 through a communication path 22. The material is poured into the material supply portion 20 in the form of a pellet, powder, or the like. In the embodiment, an ABS resin material in the form of a pellet is used.

Figure 3:
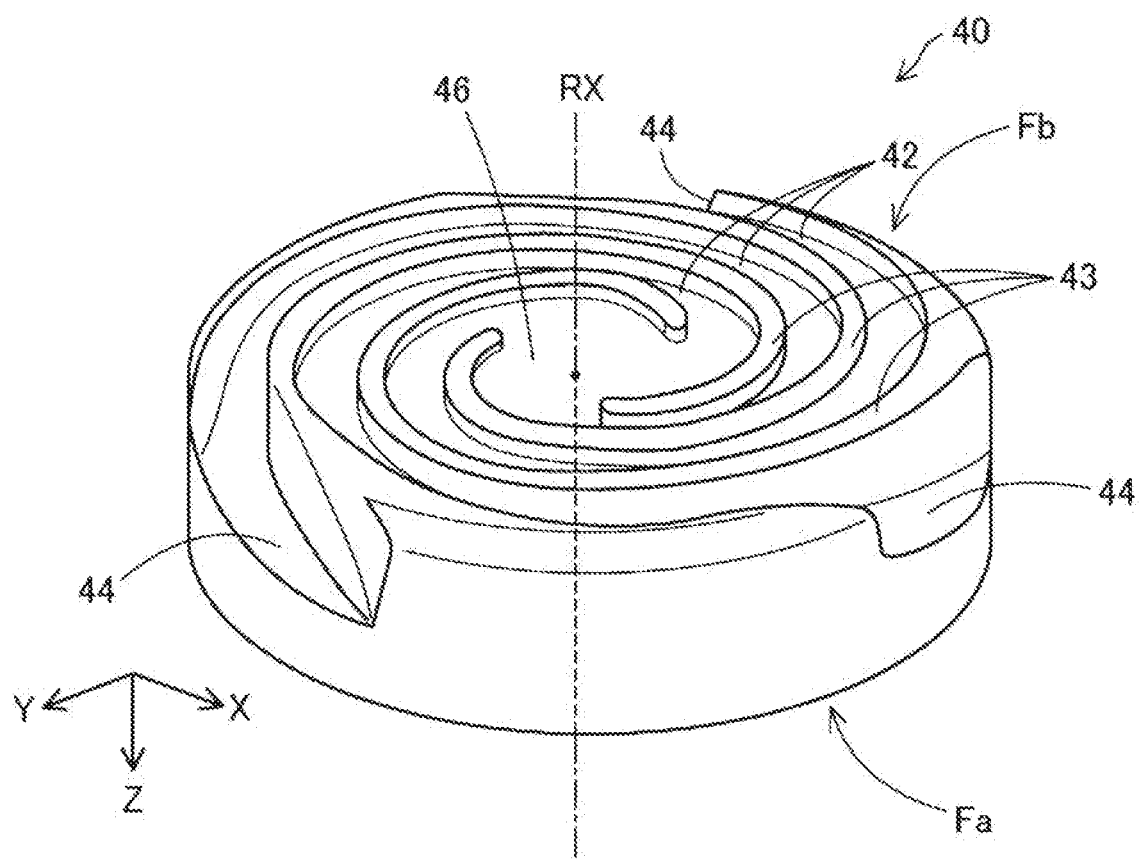
FIG. 3 is a schematic perspective view illustrating a configuration of a lower surface side of a flat screw.
Figure 4:
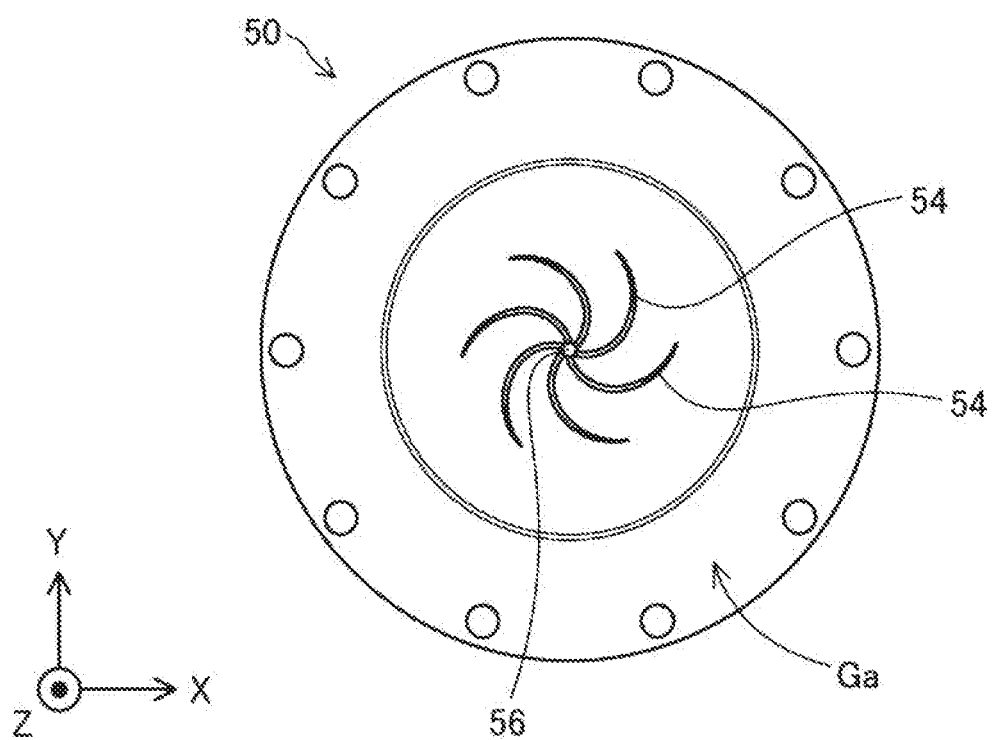
FIG. 4 is a schematic plan view illustrating an upper surface side of a screw-facing portion.

The forming material producing portion 30 melts at least a part of the material supplied from the material supply portion 20 to produce a paste-form forming material having fluidity and introduces the forming material into the ejecting portion 60. The forming material producing portion includes a screw case 31, a driving motor 32, a flat screw 40, and a screw-facing portion 50. Specific configurations of the flat screw 40 and the screw-facing portion 50 are illustrated in FIGS. 3 and 4 described below, respectively.

The flat screw 40 has a substantially cylindrical shape in which the height in an axis direction is less than the diameter, the axis direction being a direction along a central axis thereof. The flat screw 40 is disposed such that the axis direction is parallel to the Z direction and rotates along a circumferential direction. The central axis of the flat screw 40 matches with a rotation axis RX. In FIG. 2, the rotation axis RX of the flat screw 40 is indicated by a chain line.

The flat screw 40 is accommodated in the screw case 31. An upper surface Fa side of the flat screw 40 is connected to the driving motor 32, and the flat screw 40 rotates in the screw case 31 due to a rotation driving force generated by the driving motor 32. The driving motor 32 is driven under the control of the controller 90.

A groove portion 42 is formed on a lower surface Fb of the flat screw 40 that is a surface intersecting the rotation axis RX. The communication path 22 of the material supply portion 20 is connected to the groove portion 42 from a side surface of the flat screw 40.

The lower surface Fb of the flat screw 40 faces an upper surface Ga of the screw-facing portion 50, and a space is formed between the groove portion 42 of the lower surface Fb of the flat screw 40 and the upper surface Ga of the screw-facing portion 50. In the forming unit 100, the material is supplied from the material supply portion 20 to the space between the flat screw 40 and the screw-facing portion 50. A specific configuration of the flat screw 40 and the groove portion 42 will be described below using FIG. 3.

In the screw-facing portion 50, a heater 58 for heating the material is embedded. The material supplied into the groove portion 42 of the rotating flat screw 40 flows along the groove portion 42 while at least a part thereof is being melted due to the rotation of the flat screw 40, and is introduced in to a center portion 46 of the flat screw 40. The paste-form material flowing into the center portion 46 is supplied to the ejecting portion 60 as the forming material through a communication hole 56 provided at the center of the screw-facing portion 50.

The ejecting portion 60 includes a nozzle 61 and a flow path 65. The nozzle 61 is connected to the communication hole 56 of the screw-facing portion 50 through the flow path 65. The flow path 65 is a flow path of the forming material between the flat screw 40 and the nozzle 61. The nozzle 61 ejects the forming material produced in the forming material producing portion 30 to the forming table 81 from an opening portion 62 of a tip thereof. The details of the nozzle 61 according to the embodiment will be described below.

As described above, the moving mechanism 80 changes the relative position between the forming table 81 and the nozzle 61. The forming table 81 is disposed at a position facing the opening portion 62 of the nozzle 61. The forming table 81 includes an upper surface Ts that is disposed parallel to the X and Y directions. In the embodiment, the moving mechanism 80 moves the forming table 81 relative to the nozzle 61 using driving forces of three motors M.

In the forming unit 100, instead of the configuration in which the moving mechanism 80 moves the forming table 81, a configuration in which the moving mechanism 80 moves the nozzle 61 relative to the forming table 81 in a state where the position of the forming table 81 is fixed may be adopted. Even in this configuration, the relative positional relationship between the nozzle 61 and the forming table 81 can be changed. In the following description, "moving distance of the nozzle 61" refers to a distance by which the nozzle 61 moves relative to the forming table 81.

FIG. 3 is a schematic perspective view illustrating a configuration of the lower surface Fb side of the flat screw 40. For easy understanding of the technique, FIG. 3 illustrates the flat screw 40 in a state where a positional relationship between the upper surface Fa and the lower surface Fb illustrated in FIG. 2 is inverted in the vertical direction. In FIG. 3, the position of the rotation axis RX of the flat screw 40 during the rotation in the forming material producing portion 30 is indicated by a chain line. As described above with reference to FIG. 2, the groove portion 42 is provided on the lower surface Fb of the flat screw 40 facing the screw-facing portion 50. Hereinafter, the lower surface Fb will also be referred to as "groove-formed surface Fb".

The center portion 46 of the groove-formed surface Fb of the flat screw 40 is configured as a recessed portion to which one end of the groove portion 42 is connected. The center portion 46 faces the communication hole 56 of the screw-facing portion 50 illustrated in FIG. 2. In the embodiment, the center portion 46 intersects with the rotation axis RX.

The groove portion 42 of the flat screw 40 configures a so-called screw groove. The groove portion 42 extends in a spiral shape from the center portion 46 to an outer circumference of the flat screw 40 to form an arc. The groove portion 42 may be configured to extend in an involute curve shape or a helical shape. On the groove-formed surface Fb, a projection strip portion 43 that configures a side wall portion of the groove portion 42 and extends along each groove portion 42 is provided.

The groove portion 42 continuously extends up to a material inlet port 44 that is formed on the side surface of the flat screw 40. The material inlet port 44 is a portion that receives the material supplied through the communication path 22 of the material supply portion 20.

When the flat screw 40 rotates, at least a part of the material supplied from the material inlet port 44 is heated and melted by the heater 58 described below in the groove portion 42 such that the fluidity of the material increases. The material flows to the center portion 46 through the groove portion 42, accumulates in the center portion 46, and is pressed out to the communication hole 56 of the screw-facing portion 50 due to an internal pressure generated in the center portion.

As illustrated in FIG. 3, the flat screw 40 includes three groove portions 42, three projection strip portions 43, and three material inlet ports 44. The numbers of the groove portions 42, the projection strip portions 43, and the material inlet ports 44 provided in the flat screw 40 are not limited to three. In the flat screw 40, only one groove portion 42 may be provided, and two or more groove portions 42 may be provided. In addition, the projection strip portions 43 and the material inlet ports 44 corresponding to the number of the groove portions 42 may be provided.

FIG. 4 is a schematic plan view illustrating the upper surface Ga side of the screw-facing portion 50. As described above, the upper surface Ga of the screw-facing portion 50 faces the groove-formed surface Fb of the flat screw 40. Hereinafter, the upper surface Ga will also be referred to as "screw-facing surface Ga".

On the screw-facing surface Ga, plural guide grooves 54 are formed. The guide groove 54 is connected to the communication hole 56 formed at the center of the screw-facing surface Ga and extends in a spiral shape from the communication hole 56 to an outer circumference thereof. The guide grooves 54 function to guide the forming material to the communication hole 56. As described above with reference to FIG. 2, in the screw-facing portion 50, the heater 58 for heating the material is embedded. The melting of the material in the forming material producing portion 30 is realized by the heating by the heater 58 and the rotation of the flat screw 40. The molten material is pressed out to the flow path 65 of the ejecting portion 60 through the communication hole 56 of the screw-facing portion 50 and then is guided to the nozzle 61. The material guided to the nozzle 61 is finally ejected from the opening portion 62.

In the forming unit 100, by using the flat screw 40 having a small size in the Z direction, an occupancy range in the Z direction of a route for melting at least a part of the material and introducing the molten material to the nozzle 61 is reduced (refer to FIG. 2). This way, in the forming unit 100, by using the flat screw 40, the size of the mechanism of forming the forming material is reduced. In addition, by using the flat screw 40, the accuracy of the ejection control of the forming material from the nozzle 61 is improved, and the object can be easily and effectively formed through the ejection step.

In the forming unit 100, by using the flat screw 40, the configuration of supplying the forming material that is treated to have fluidity to the nozzle 61 is easily realized. In this configuration, the amount of the forming material ejected from the opening portion 62 of the nozzle 61 can be controlled by controlling the rotation speed of the flat screw 40, and the ejection control of the forming material from the opening portion 62 is simplified. "The amount of the forming material ejected from the opening portion 62" refers to the flow rate of the forming material flowing out from the opening portion 62 of the nozzle 61.

Figure 5:
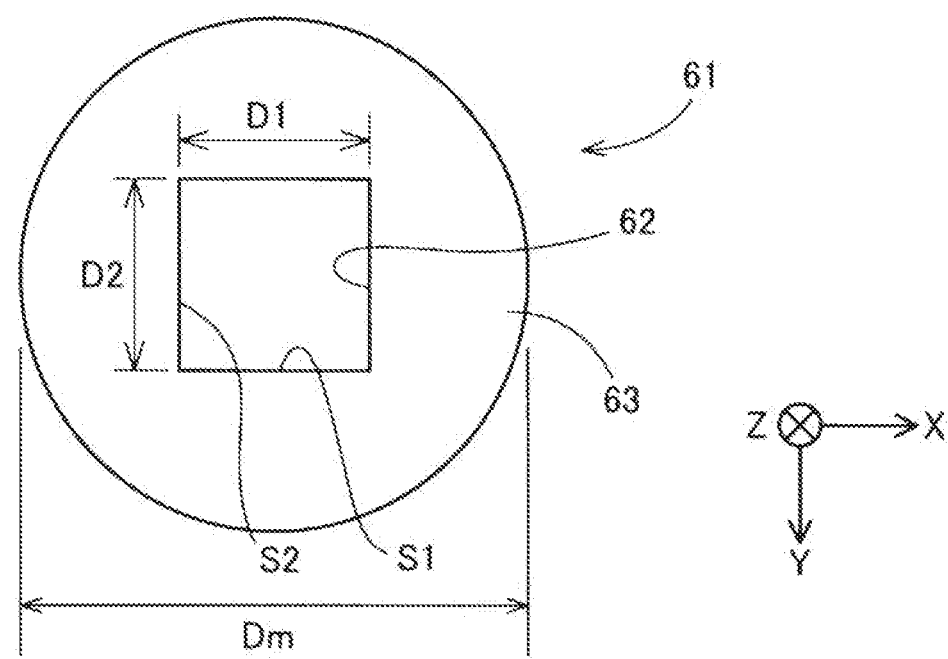
FIG. 5 is a front view illustrating a configuration of a nozzle included in the forming unit according to the embodiment.

The shape of the opening portion 62 of the nozzle 61 will be described using FIG. 5. FIG. 5 is a front view illustrating a configuration of the nozzle 61 included in the forming unit 100 according to the embodiment. The tip of the nozzle 61 is configured by a circular surface, and the opening portion 62 and a planar portion 63 are provided on this surface. In the embodiment, the surface of the tip of the nozzle 61 has a circular shape having a diameter Dm. "The surface formed at the tip of the nozzle 61" is a surface formed along a moving direction of the nozzle 61 when the forming material is ejected in a layered shape and, in the embodiment, is a surface parallel to a XY plane.

The opening portion 62 is an opening provided on the surface of the tip of the nozzle 61. In the embodiment, the shape of the opening portion 62 is square. In this specification, "the shape of the opening portion 62" refers to a cross-sectional shape of the opening of the tip of the nozzle 61 on a plane perpendicular to an ejecting direction of the forming material and refer to an external shape of the opening. The shape of the opening portion 62 is not limited to a square shape. For example, various polygonal shapes having plural corners such as a pentagonal shape or a hexagonal shape can also be adopted. Each of the corners of the polygonal shape is not necessarily linear, and at least a part thereof may be rounded. In the embodiment, the center of the planar portion 63 and the center of the opening portion 62 overlap each other. The details of the planar portion 63 will be described below.

FIG. 5 illustrates a side S1 of the opening portion 62 along the X direction, a length D1 of the side S1, a side S2 of the opening portion 62 along the Y direction, and a length D2 of the side S2. In the embodiment, the opening portion 62 is square, and the length D1 and the length D2 are equal to each other. Hereinafter, an ejection process of the forming unit 100 according to the embodiment will be described with reference to FIGS. 5, 6, and 7.

Figure 6:
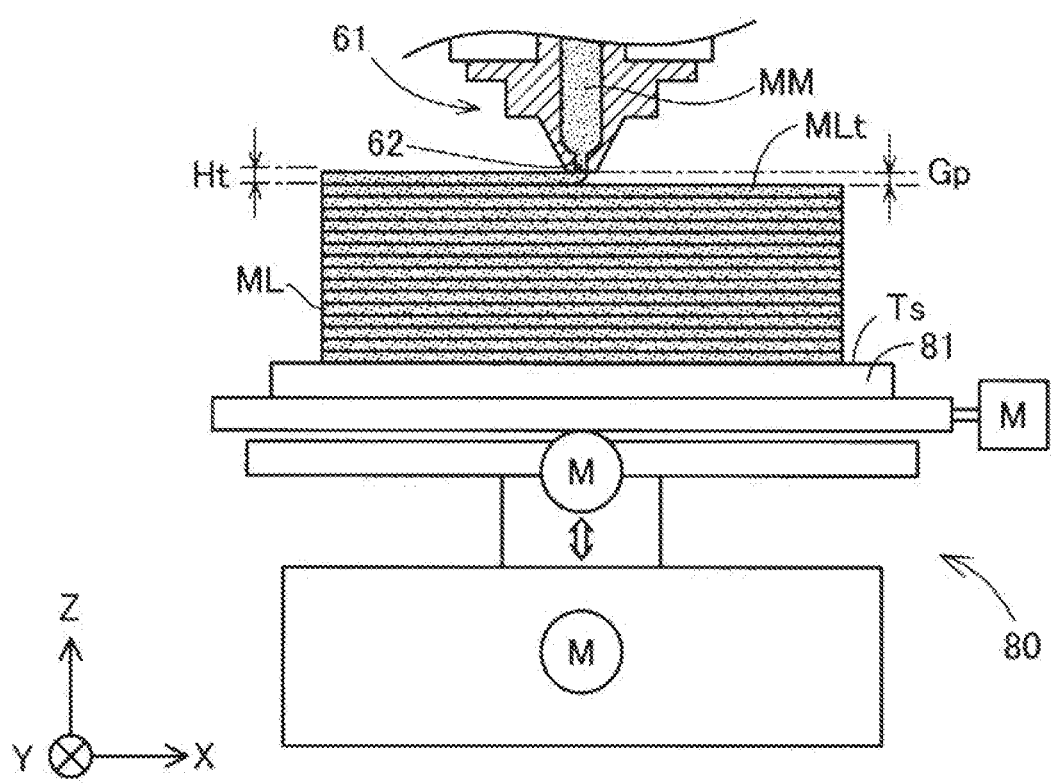
FIG. 6 is a schematic diagram schematically illustrating a state where an object is being formed through an ejection process.
Figure 7:
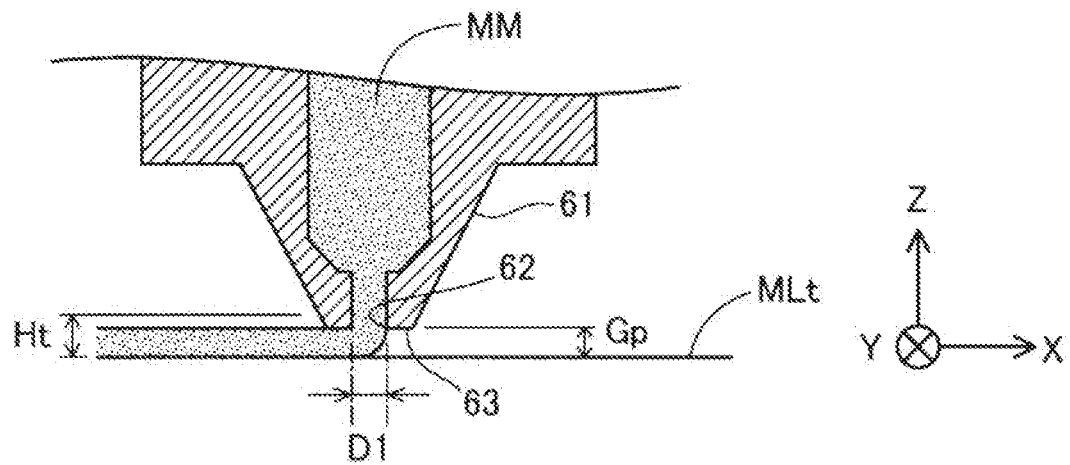
FIG. 7 is an enlarged view illustrating the vicinity of a tip of the nozzle of FIG. 6.

FIG. 6 is a schematic diagram schematically illustrating a state where an object is being formed through the ejection process to be executed by the forming unit 100. FIG. 7 is an enlarged view illustrating the vicinity of the tip of the nozzle 61 of FIG. 6. In the following description, "scanning direction of the nozzle 61" refers to a direction in which the position of the nozzle 61 moves relative to the upper surface Ts of the forming table 81 while the nozzle 61 is ejecting the forming material. In the embodiment, the upper surface Ts of the forming table 81 is horizontally disposed. Therefore, when the scanning direction of the nozzle 61 is parallel to the X direction or the Y direction, the scanning direction of the nozzle 61 is parallel to the horizontal direction. FIG. 6 illustrates a state where a forming material MM is being ejected when the X direction is the scanning direction of the nozzle 61.

In the ejection process to be executed by the forming unit 100, in the forming material producing portion 30, at least a part of the solid material supplied to the rotating flat screw 40 is melted to produce the forming material MM. The forming material MM is ejected from the nozzle 61 to an estimated position MLt while changing the position of the nozzle 61 relative to the forming table 81 using the moving mechanism 80 in the scanning direction along the upper surface Ts of the forming table 81. When the forming material MM is deposited on a formed layer ML, the estimated position MLt is an upper surface of the formed layer ML on which the forming material MM is to be deposited and that is to be positioned below the nozzle 61. When the forming material MM is deposited on the forming table 81, the estimated position MLt is the upper surface Ts. In the ejection process, the forming material MM ejected from the nozzle 61 is continuously deposited along the scanning axis of the nozzle 61.

The controller 90 controls the moving mechanism 80 such that the position of the nozzle 61 is moved relative to the forming table 81 in the Z direction and the forming material MM is further deposited on the formed layer ML formed in the previous ejection process. As a result, an object is formed. Hereinafter, a layer formed of the forming material MM that is deposited on the upper surface Ts of the forming table 81 through the ejection process of the nozzle 61 will also be referred to as "formed layer ML". When ejection data is decomposed in units of Voxel, the formed layer ML refers to a layer formed of the forming material corresponding to 1 Voxel in the Z direction, 1 Voxel being the unit moving amount of the nozzle 61. That is, the formed layer ML is not determined depending on an ejection method from the nozzle 61. For example, assuming that the forming material is continuously ejected from the nozzle 61 while moving the nozzle 61 along the X direction, the nozzle 61 is turned at an end portion without stopping the ejection, and the forming material is continuously ejected from the nozzle 61 while moving the nozzle 61 in a direction opposite to the X direction, two formed layers ML are obtained the formed layers ML including: a formed layer that is deposited along the X direction; and a formed layer that is further deposited on an upper surface of the formed layer in the direction opposite to the X direction. In the forming unit 100, an object is formed by laminating the formed layers ML.

When the formed layer ML is formed, a gap having a distance Gp described below is maintained between the planar portion 63 of the tip of the nozzle 61 and the estimated position MLt to which the forming material MM ejected from the opening portion 62 is to be deposited in the vicinity of the position immediately below the nozzle 61.

A state where the forming material MM is being ejected from the opening portion 62 along with the movement of the nozzle 61 will be described using FIGS. 6 and 7. The forming material MM ejected from the opening portion 62 in the gravity direction opposite to the Z direction comes into contact with the estimated position MLt and subsequently is deposited along the surface of the estimated position MLt along the movement of the nozzle 61. The forming material MM to be ejected from the nozzle 61 is a plasticized resin and has a predetermined viscosity. Therefore, the ejected forming material MM has a cross-sectional shape conforming to the shape of the opening portion 62 illustrated in FIG. 5 and can be considered as a cylinder in which the shape of the opening portion 62 is maintained to some extent. The cylindrical shape of the forming material MM ejected from the nozzle 61 is bent along the estimated position MLt along with the movement of the nozzle 61. Accordingly, when a sufficient distance (space) is present between the nozzle 61 and the estimated position MLt, by bending and depositing the forming material MM, the forming material MM is deposited in a state where the width in the X direction of the cylinder that is just pressed out from the opening portion 62 is the same as the height in the Z direction corresponding to the length D1 of the side S1 of the opening portion 62.

In the actual nozzle 61, the distance Gp between the estimated position MLt and the planar portion 63 of the tip of the nozzle 61 is less than the lengths D1 and D2 of the respective sides S1 and S2 of the opening portion 62. Therefore, the height of the forming material MM to be deposited on the estimated position MLt is less than the length D1 or D2 and is restricted by the distance Gp.

An ejection method for a three-dimensional object that is executed by the forming unit 100 according to the embodiment will be described using FIG. 7. FIG. 7 illustrates the distance Gp of the gap between the planar portion 63 and the estimated position MLt to which the forming material MM is to be deposited and an imaginary height Ht in a cross-sectional shape of the ejected forming material MM. As described above, the height Ht changes depending on the shape of the opening portion 62 of the nozzle 61 and the scanning direction of the nozzle 61. In FIG. 7, the scanning direction of the nozzle 61 is parallel to the X direction. The height Ht refers a height of a cross-sectional shape of the forming material MM when a sufficient distance (space) is present between the nozzle 61 and the estimated position MLt, and is a height that is predetermined according to the length D1 of the opening portion 62.

The forming unit 100 according to the embodiment repeats the movement of the nozzle 61 and the ejection of the forming material MM from the opening portion 62 in a state the distance Gp from the planar portion 63, which is the tip during the ejection of the forming material MM, to the estimated position MLt, which is the surface on which the forming material MM is deposited, is maintained at a position that is 0.7 times of the height Ht. That is, the ejection process is executed while pressing the forming material MM using a part of the planar portion 63 of the nozzle 61. This way, in the forming unit 100 according to the embodiment, three-dimensional forming is performed in a state where the distance between the tip of the nozzle 61 and the estimated position MLt to which the forming material MM is to be deposited is less than the height Ht of the ejected forming material.

Figure 8:
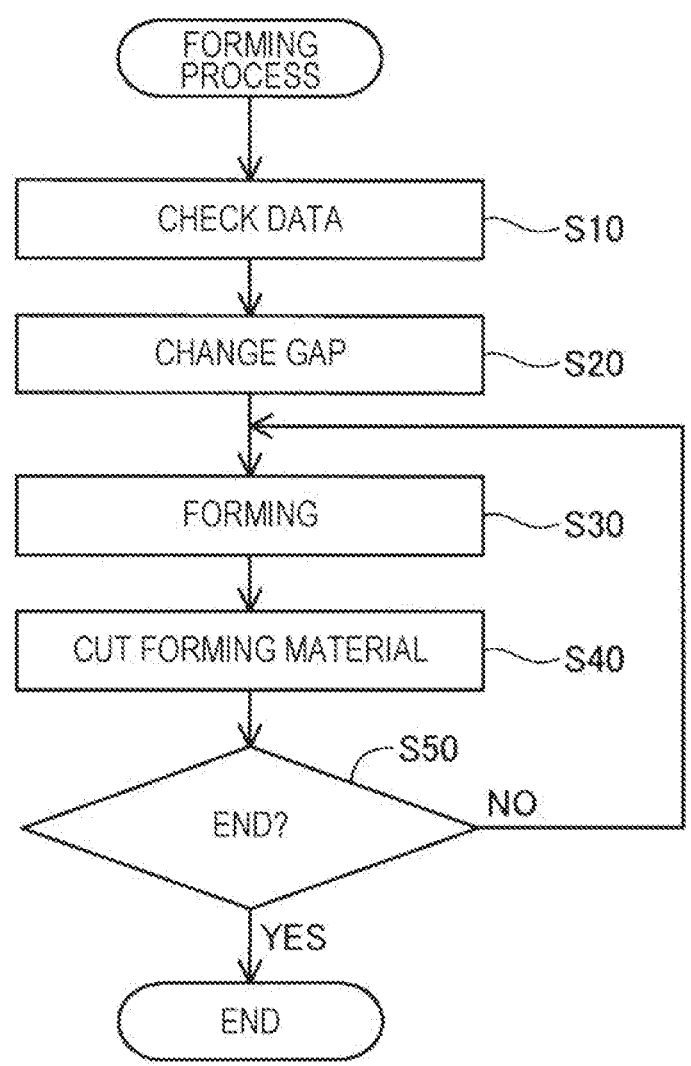
FIG. 8 is a flowchart illustrating a control of a forming process to be executed by a controller.

FIG. 8 is a flowchart illustrating the control of the forming process to be executed by the controller 90 of the forming unit 100 according to the embodiment. The forming process illustrated in FIG. 8 is executed when the start of forming is instructed, for example, by pressing a forming start button (not illustrated) of the forming unit 100. Using a dedicated program, a shape of an object to be formed is decomposed in units of Voxel and is converted into ejection data of the forming material MM of each layer to be formed, 1 Voxel being the unit moving amount of the nozzle 61.

The computer of the controller 90 checks the ejection data and completes calculation of scanning route data regarding a method of moving the ejecting portion 60 to efficiently deposit the forming material MM during the formation of each layer of the object (Step S10). In the embodiment, the scanning direction of the nozzle 61 is set as only the X direction. The computer of the controller 90 controls the moving mechanism 80 to change the distance Gp (Step S20). The value of the distance Gp is preset and stored in a storage device of the controller 90. The computer of the controller 90 reads the set value of the storage device. As a result, when controlling the nozzle 61 in the scanning direction, the controller 90 can set the distance Gp to be 0.7 times of the height Ht according to the scanning direction.

The computer of the controller 90 executes the ejection process in the X direction of the scanning direction to form an object (Step S30). The computer of the controller 90 executes a control of the forming table 81 using the moving mechanism 80 and a control of the cutting unit 99 such that a recessed portion of the surface of the forming material that is ejected and cured is cut and planarized (Step S40). As a result, the porosity in the three-dimensional object can be further reduced. In addition, the three-dimensional object having a high dimensional accuracy can be obtained.

When all the ejection processes end (S50: YES), the computer of the controller 90 proceeds to "END" and ends the process of FIG. 8. When all the ejection processes do not end (S50: NO), the process of the controller 90 returns to Step S30, and the computer of the controller 90 continues forming through the ejection process. As described above, in the forming unit 100 according to the embodiment, the controller 90 performs three-dimensional forming in a state where the distance Gp between the tip of the nozzle 61 and the estimated position MLt to which the forming material is to be deposited is less than the height of the ejected forming material.

FIG. 9 is a side view schematically illustrating the formed layers ML that are deposited through the ejection process of the forming unit 100 according to the embodiment. FIG. 9 illustrates a state where the formed layer ML are deposited on the upper surface Ts of the forming table 81 in a lattice shape of three rows and three columns in a direction perpendicular to the upper surface Ts when the X direction is the scanning direction of the nozzle 61. For easy understanding of the technique, the formed layers ML of FIG. 9 do not under to the cutting step. FIG. 9 illustrates a height D11 and a width D12 of one formed layer ML and voids Sp between the formed layers ML.

Under the control of the controller 90, three-dimensional forming is performed in a state where the distance Gp between the tip of the nozzle 61 and the estimated position MLt to which the forming material MM is to be deposited is less than the height Ht of the ejected forming material MM. The opening portion 62 of the nozzle 61 of the forming unit 100 according to the embodiment is square, and when the area of an external shape of the opening portion 62 is represented by an area Sq1 and the volume of the forming material MM to be ejected per unit moving amount of the nozzle 61 is represented by a volume Vt, the volume Vt can be obtained from the following Expression (1). The area Sq1 is the area of the shape of the opening portion 62 and is the area of a portion surrounded by the external shape of the opening portion 62.

$$\text{Volume } Vt = \text{Area } Sq1 \times \text{Height } Ht \tag{1}$$

At this time, the distance Gp can be obtained as a value satisfying the following Expression (2).

$$(\text{Area } Sq1 \times \text{Distance } Gp)/\text{Volume } Vt < 1.0 \tag{2}$$

As a result, regarding the forming material to be ejected from the opening portion 62 of the nozzle 61, for example, when the estimated position MLt to which the material is to be deposited has a surface shape of the upper surface Ts of the forming table 81, the forming material MM is deposited on the upper surface Ts of the forming table 81 while being pressed by the planar portion 63 of the nozzle 61. Therefore, a cross-sectional shape of the formed layer ML is not square, and the height D11 is less than the width D12. Thus, the material can be deposited while contouring a wall surface of the forming material that is already disposed at a position adjacent thereto or a wall surface of the forming material that is already disposed therebelow. As a result, the forming material is deposited so as to bury voids in the vicinity of the estimated position MLt to which the forming material is to be deposited.

FIG. 10 illustrates experiment data relating to measured porosities of objects formed while changing the distance Gp for each shape of the opening portion 62. As the external shape of the opening portion 62, two shapes including a circular shape having a diameter of 1.0 mm and a square shape in which Length D1=Length D2=1.00 mm are adopted. Under three conditions of 1.0 mm, 0.7 mm, and 0.5 mm as the distance Gp, the porosity of the object is measured for each shape of the opening portion 62. When the shape of the opening portion 62 is the circular shape having a diameter of 1.0 mm, the height Ht of the forming material MM is about 1.00 mm. When the shape of the opening portion 62 is the square shape in which Length D1=Length D2=1.00 mm, the height Ht is about 1.00 mm. As shown in Expression (1), the volume Vt is constant for each shape of the opening portion 62. That is, the volume Vt is constant irrespective of the change in distance Gp for each shape of the opening portion 62.

When the shape of the opening portion 62 is square, a three-dimensional object having a lower porosity can be obtained as compared to a case where the shape of the opening portion 62 is circular. As described above, the reason for this is that a cross-sectional shape of the forming material MM to be ejected from the nozzle 61 is substantially quadrangular such that the voids Sp are reduced as compared to a case where the shape of the opening portion 62 of the nozzle 61 is circular.

When the shape of the opening portion 62 is set as a square shape having a width of 1.0 mm and the distance Gp is set as 0.7 mm, the porosity of the object is 0.03%, which is the lowest. On the other hand, even when the shape of the opening portion 62 is set as a square shape, in a case where the distance Gp is set as 0.5 mm, the porosity of the object is 0.41%, which is higher than that when the distance Gp is set as 1.0 mm. The ejected forming material MM protrudes from an end portion of the planar portion 63 due to the pressing of the planar portion 63 such that a cross-sectional shape of the forming material MM deviates from a quadrangular shape. This way, when the shape of the opening portion 62 is square, it is preferable that the distance Gp is more than 0.5 times and less than 1.0 time. That is, the distance Gp can be obtained as a value satisfying the following Expression (3).

$$0.5 < (\text{Area } Sq1 \times \text{Distance } Gp)/Vt < 1.0 \tag{3}$$

Accordingly, the three-dimensional object having a low porosity can be obtained, and a decrease in the strength of the three-dimensional object can be suppressed.

FIG. 11 is a side view illustrating a configuration of the planar portion 63 of the nozzle 61. FIG. 11 illustrates a state where the forming material MM is being ejected under the control of the controller 90 when the X direction is the scanning direction of the nozzle 61. At this time, the forming material MM ejected from the opening portion 62 is pressed by the planar portion 63.

Here, when the volume of a space corresponding to the distance Gp between the surface of the tip of the nozzle and the estimated position MLt to which the forming material is to be deposited is represented a volume Vn, the volume Vn can be obtained based on the area (hereinafter, also referred to as "area Sq2") of the external shape of the planar portion 63 having the diameter Dm illustrated in FIG. 5 and the distance Gp. The forming material MM is ejected to the space having the volume Vn. When the volume of the forming material MM to be ejected to the space per unit moving amount of the nozzle 61 is represented by the volume Vt, in a case where the volume Vt is more than the volume Vn, the forming material MM may protrude from an end portion of the planar portion 63 of the nozzle. In the forming unit 100 according to the embodiment, the diameter Dm of the planar portion 63 is set such that the volume Vn is more than the volume Vt. That is, in the forming unit 100 according to the embodiment, the controller 90 controls the moving mechanism 80 such that the distance Gp satisfies the following Expression (4).

(Area $Sq2$×Distance $Gp$)/Volume $Vt$<1.0  (4)

As a result, the protrusion of the forming material MM from an end portion of the tip surface of the nozzle 61 is suppressed. As described above, the height Ht changes depending on the shape and direction of the opening portion 62 of the nozzle 61 and the scanning direction of the nozzle 61. Therefore, it is necessary to calculate each of the items of Expressions (1) to (4) for each condition of the shape and direction of the opening portion 62 and the scanning direction of the nozzle 61.

In the embodiment, an ABS resin material in the form of a pellet is used. As the material used in the forming unit 100, for example, a material for forming an object that includes various materials a thermoplastic material, a metal material, or a ceramic material as a main material can also be adopted. Here, "main material" refers to a material that mainly forms a shape of an object, and the content thereof in the object is 50 wt % or higher. Examples of the forming material include the main material that is melted alone and a paste-form material in which not only the main material but also some components are melted.

When the thermoplastic material is used as the main material, the forming material MM is produced by plasticizing the corresponding material in the forming material producing portion 30. "Plasticizing" refers to applying heat to the thermoplastic material to be melted.

As the thermoplastic material, for example, one kind or a combination of two or more kinds selected from the following thermoplastic resin materials can be used.

Examples of Thermoplastic Resin Material

A general engineering plastic such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, or polyethylene terephthalate; and an engineering plastic such as polysulfone, polyether sulfone, polyphenylene sulfide, polyarylate, polyimide, polyamide imide, polyether imide, or polyether ether ketone A pigment, a metal, a ceramic, or an additive such as a wax, a flame retardant, an antioxidant, or a heat stabilizer may be incorporated into the thermoplastic material. The thermoplastic material is plasticized and melted by the rotation of the flat screw 40 and the heating of the heater 58 in the forming material producing portion 30. In addition, the forming material MM produced as described above is ejected from the nozzle 61 and then is cured by a temperature decrease.

It is preferable that the thermoplastic material is ejected from the nozzle 61 in a state where the thermoplastic material is heated to a glass transition point thereof or higher and is completely melted. For example, the glass transition point of an ABS resin is about 120° C., and it is preferable that the temperature of the ABS resin is about 200° C. when ejected from the nozzle 61. In order to eject the forming material MM in a high-temperature state, a heater may be provided in the vicinity of the nozzle 61.

In the forming unit 100, for example, the following metal material may be used as the main material instead of the thermoplastic material. In this case, it is preferable that components melted during the production of the forming material MM are mixed with a powder material of the following metal materials and the mixture is poured into the forming material producing portion 30.

Example of Metal Material

One kind of metal or an alloy including one or more kinds selected from magnesium (Mg), iron (Fe), cobalt (Co), chromium (Cr), aluminum (Al), titanium (Ti), copper (Cu), and nickel (Ni)

Example of Alloy

Maraging steel, stainless steel, cobalt-chromium-molybdenum, titanium alloys, nickel alloys, aluminum alloys, cobalt alloys, and cobalt-chromium alloys In the forming unit 100, a ceramic material may be used as the main material instead of the metal material. As the ceramic material, for example, an oxide ceramic such as silicon dioxide, titanium dioxide, aluminum oxide, or zirconium oxide or a non-oxide ceramic such as aluminum nitride can be used. When the metal material or the ceramic material is used as the main material, the forming material MM disposed on the forming table 81 may be cured through sintering by laser irradiation, hot air blowing, or the like.

The powder material of the metal material or the ceramic material to be poured into the material supply portion 20 may be a mixed material obtained by mixing plural kinds of single metal powders or alloy powders, or ceramic material powders. In addition, the powder material of the metal material or the ceramic material may be coated with the above-described thermoplastic resins or other thermoplastic resins. In this case, in the forming material producing portion 30, this thermoplastic resin may be melted to exhibit fluidity.

For example, the following solvent can also be added to the powder material of the metal material or the ceramic material to be poured into the material supply portion 20. As the solvent, one kind or a combination of two or more kinds selected from the above examples can be used.

Examples of Solvent

Water; (poly)alkylene glycol monoalkyl ethers such as ethylene glycol monomethyl ether, ethylene glycol monoethyl ether, propylene glycol monomethyl ether, or propylene glycol monoethyl ether; acetates such as ethyl acetate, n-propyl acetate, isopropyl acetate, n-butyl acetate, or isobutyl acetate; aromatic hydrocarbons such as benzene, toluene, or xylene; ketones such as methyl ethyl ketone, acetone, methyl isobutyl ketone, ethyl-n-butyl ketone, diisopropyl ketone, or acetyl acetone; alcohols such as ethanol, propanol, or butanol; tetraalkylammonium acetates; sulfoxide solvents such as dimethyl sulfoxide or diethyl sulfoxide; pyridine solvents such as pyridine, γ-picoline, or 2,6-lutidine; tetraalkylammonium acetates (for example, tetrabutylammonium acetate); and ionic liquids such as butyl carbitol acetate In addition, the following binder can also be added to the powder material of the metal material or the ceramic material to be poured into the material supply portion 20.

Examples of Binder

An acrylic resin, an epoxy resin, a silicone resin, a cellulose resin, or other synthetic resins; and thermoplastic resins such as polylactic acid (PLA), polyamide (PA), polyphenylene sulfide (PPS), polyether ether ketone (PEEK), or other thermoplastic resins

B. Other Embodiments (B1) In the embodiment, the shape of the surface of the tip of the nozzle 61 is a circular shape having the diameter Dm. On the other hand, the shape of the surface of the tip of the nozzle 61 is not limited to a circular shape. As the shape of the surface of the tip of the nozzle, various shapes such as a polygonal shape can be adopted as long as a surface is provided at the tip of the nozzle.

(B2) In the embodiment, the center of the planar portion 63 and the center of the opening portion 62 overlap each other. On the other hand, the center of the planar portion and the center of the opening portion may not overlap each other. In this aspect, it is preferable that the center of the planar portion and the center of the opening portion are disposed at positions such that the material ejected from the opening portion does not protrude from an end portion of the planar portion.

(B3) In the embodiment, the forming unit 100 includes the flat screw 40. On the other hand, a forming head may adopt various types such as a screw type, a plunger type, or a preplasticating type without including the flat screw.

(B4) In the embodiment, the moving mechanism 80 is configured by a three-axis positioner that moves the forming table 81 in the three axis directions as the X, Y, and Z directions using driving forces of the three motors M. On the other hand, the relative position between the nozzle and the forming table may be changed by a component other than the forming table including a mechanism that moves in the three axis directions, for example, by the forming unit including a mechanism that moves in the Z direction. Each of the forming table and the component other than the forming table may include a mechanism that moves in the three axis directions, or the relative position between the nozzle and the forming table in the three axis directions may be changed by combining the moving mechanism of the forming table and the component other than the forming table with each other. By using the forming unit that is combined with the component having a higher machine accuracy than the forming table, a three-dimensional object having a higher accuracy can be formed. When the forming table and the component other than the forming table can move in the three axis directions at the same time, a speed at which the nozzle is moved relative to a predetermined position of the forming table can be increased.

(B5) In the embodiment, the nozzle may include a mechanism that rotates around a direction in which the forming material is supplied as a central axis. The nozzle may be rotated when the forming unit rotates. In this aspect, the direction of the opening portion of the nozzle can be changed in response to a change in the direction in which the forming material is deposited. Accordingly, even when the shape of the opening portion is a shape having sides with different lengths, for example, a rectangular shape (that is, a quadrangular shape in which Length D1≠D2), the same effects as those of the embodiment can be obtained for each scanning direction by changing the direction of the opening portion of the nozzle according to the scanning direction.

(B6) In the embodiment, the scanning direction of the nozzle 61 is set to be fixed to the X direction under the control of the controller 90. On the other hand, the scanning direction of the nozzle is not limited to the X direction and may be the Y direction or a direction as a combination of the three directions X, Y, and Z directions. In this aspect, it is preferable that the scanning direction is verified from predetermined scanning route data and is changed such that the forming material can be efficiently deposited according to ejection data of each layer. At this time, the distance Gp may be changed for each scanning direction according to the scanning direction of the nozzle 61. In this aspect, even when the shape of the opening portion is a shape having sides with different lengths, for example, a rectangular shape, the same effects as those of the embodiment can be obtained irrespective of the scanning direction by changing the distance Gp to a value that corresponds to the length of the side of the opening portion corresponding to the scanning direction of the nozzle.

(B7) The three-dimensional forming apparatus 10 according to the embodiment includes the cutting unit 99. On the other hand, the cutting unit 99 may not be provided, and the forming material may be cut in another step. In addition, instead of the cutting unit 99, a polishing device that polishes the surface of the cured forming material may be provided.

(B8) In Step S20, the controller 90 according to the embodiment starts the forming process of Step S30 after controlling the moving mechanism 80 such that the distance Gp is changed. On the other hand, the distance Gp may be partially changed, for example, by executing a part of all the forming processes for completely forming a three-dimensional object. In this aspect, for example, even when voids are necessary depending on the design of a formed object, voids can be intentionally formed with the formed layer that is already formed under the control of controller 90.

C. Other Aspects

The present disclosure is not limited to the above-described embodiments and can be realized in various aspects within a range not departing from the scope of the disclosure. For example, the present disclosure can be realized by the following aspects. For example, the technical features of any one of the embodiments corresponding to the technical features of any one of the aspects described below can be appropriately replaced or combined in order to solve a part or all of the problems of the present disclosure or to achieve a part or all of the effects of the present disclosure. In addition, the technical features may be appropriately omitted unless they are described as essential features in this specification.

(1) According to one aspect of the present disclosure, a three-dimensional forming apparatus is provided. This three-dimensional forming apparatus includes: an ejecting portion ejecting a forming material from an opening portion to a forming table; a moving portion that changes a relative position between the forming table and the ejecting portion; and a controller that controls the ejecting portion and the moving portion such that a three-dimensional object is formed. The ejecting portion may include a tip surface having the opening portion. An external shape of the opening portion may be polygonal, and when the three-dimensional object is formed, the controller may control the moving portion such that a distance (Gp) between the tip surface and an estimated position to which the forming material is to be ejected from the ejecting portion satisfies the following Expression (1).

$$(Sq1 \times Gp)/Vt < 1.0 \qquad (1)$$

where Sq1 represents an area of the opening portion, and Vt represents a volume of the forming material that is ejected per unit moving amount by the ejecting portion.

In the three-dimensional forming apparatus according to the aspect, under the control of the controller, three-dimensional forming is performed in a state where the distance between the tip of the nozzle and the estimated position to which the forming material is to be deposited is less than the height of the ejected forming material. Therefore, the forming material to be ejected from the nozzle is deposited on the upper surface of the forming table, which is the estimated position to which the material is to be deposited, while being pressed by the tip surface of the nozzle. Thus, the material can be deposited while contouring a wall surface of the forming material that is already disposed at a position adjacent thereto or a wall surface of the forming material that is already disposed therebelow. That is, the forming material is deposited so as to bury voids in the vicinity of the estimated position to which the forming material is to be deposited. Accordingly, the three-dimensional object having a low porosity can be obtained, and a decrease in the strength of the three-dimensional object can be suppressed.

(2) In the three-dimensional forming apparatus according to the aspect, the external shape of the opening portion may be quadrangular. In the three-dimensional forming apparatus according to the aspect, the cross-sectional area of the forming material to be ejected from the nozzle is substantially quadrangular, and the three-dimensional object having a lower porosity can be obtained as compared to a case where the nozzle shape is circular.

(3) In the three-dimensional forming apparatus according to the aspect, when the three-dimensional object is formed, the controller may control the moving portion such that the distance satisfies the following Expression (2).

$$0.5 < (Sq1 \times Gp)/Vt < 1.0 \qquad (2)$$

where Sq1 represents an area of the opening portion, and Vt represents a volume of the forming material that is ejected per unit moving amount by the ejecting portion.

In the three-dimensional forming apparatus according to the aspect, the porosity of the three-dimensional object can be further reduced.

(4) In the three-dimensional forming apparatus according to the aspect, when the three-dimensional object is formed, the controller may control the moving portion such that the distance satisfies the following Expression (3).

$$(Sq2 \times Gp)/Vt > 1.0 \qquad (3)$$

where Sq2 represents an area of the tip surface, and Vt represents a volume of the forming material that is ejected per unit moving amount by the ejecting portion.

In the three-dimensional forming apparatus according to the aspect, the volume of the space between the nozzle tip surface and the surface to which the forming material is to be deposited is designed to be more than the amount of the forming material ejected from the nozzle. Accordingly, the protrusion of the forming material from an end portion of the nozzle tip surface is suppressed.

(5) The three-dimensional forming apparatus according to the aspect may further include a material producing portion that includes a flat screw and produces the forming material by melting at least a part of a material to be supplied to the rotating flat screw. In the three-dimensional forming apparatus according to the aspect, the flat screw is further provided. As a result, the size of the mechanism of producing the forming material can be reduced, and the size of the entire apparatus can be reduced. In addition, by using the flat screw, the accuracy of the ejection control of the forming material from the nozzle is improved, and the object can be easily and effectively formed through the ejection step.

(6) The three-dimensional forming apparatus according to the aspect may further include a cutting portion that cuts a surface of the forming material that is ejected and cured. The controller controls the cutting portion such that the surface of the cured forming material is planarized. In the forming apparatus according to the aspect, the forming material that is ejected and cured can be cut. Accordingly, for example, by cutting a recessed portion of the surface of each layer of the deposited material to be planarized, the porosity in the three-dimensional object can be further reduced. In addition, the three-dimensional object having a higher dimensional accuracy can be obtained.

(7) According to another aspect of the present disclosure, a method of forming a three-dimensional object is provided, the method comprising ejecting a forming material from an opening portion of an ejecting portion to form a three-dimensional object. In the method of forming a three-dimensional object, a tip surface is provided at a tip of the ejecting portion, an opening portion having a polygonal external shape from which the forming material is ejected is provided on the tip surface, and the three-dimensional object is formed such that a distance (Gp) between the tip surface and an estimated position to which the forming material is to be ejected from the ejecting portion satisfies the following Expression (4).

$$(Sq1 \times Gp)/Vt < 1.0 \qquad (4)$$

where Sq1 represents an area of the opening portion, and Vt represents a volume of the forming material that is ejected per unit moving amount by the ejecting portion.

In the method of forming a three-dimensional object according to the aspect, three-dimensional forming is performed in a state where the distance between the tip of the nozzle and the estimated position to which the forming material is to be deposited is less than the height of the ejected forming material. Therefore, the forming material to be ejected from the nozzle is deposited on the upper surface of the forming table, which is the estimated position to which the material is to be deposited, while being pressed by the tip surface of the nozzle. Accordingly, the three-dimensional object having a low porosity can be obtained, and a decrease in the strength of the three-dimensional object can be suppressed.

The present disclosure can also be realized in various forms other than the three-dimensional forming apparatus or the method of forming a three-dimensional object. For example, the present disclosure can be realized in forms such as a three-dimensional object that is formed using the forming method or the three-dimensional forming apparatus, a control method of the forming apparatus, a control device of the forming apparatus, a method of depositing the forming material constituting the three-dimensional object, or an injection molding machine that adopts the forming unit. In addition, the present disclosure can be realized in forms such as a computer program for realizing the method or the control method or a non-transitory storage medium in which the computer program is recorded.

What is claimed is:
1. A three-dimensional forming apparatus comprising:
   an ejecting portion that ejects a forming material from an opening portion to a forming table;
   a moving portion that changes a relative position between the forming table and the ejecting portion; and a controller that controls the ejecting portion and the moving portion such that a three-dimensional object is formed, wherein the ejecting portion includes a tip surface having the opening portion, an external shape of the opening portion is polygonal, and when the three-dimensional object is formed, the controller controls the moving portion such that a distance (Gp) between the tip surface and an estimated position to which the forming material is to be ejected from the ejecting portion satisfies the following Expression (1), $$(Sq1 \times Gp)/Vt < 1.0 \tag{1}$$

where Sq1 represents an area of the opening portion, and Vt represents a volume of the forming material that is ejected per unit moving amount by the ejecting portion.

2. The three-dimensional forming apparatus according to claim 1, wherein the external shape of the opening portion is quadrangular.

3. The three-dimensional forming apparatus according to claim 1, wherein when the three-dimensional object is formed, the controller controls the moving portion such that the distance satisfies the following Expression (2), $$0.5 < (Sq1 \times Gp)/Vt < 1.0 \tag{2}$$

4. The three-dimensional forming apparatus according to claim 1, wherein when the three-dimensional object is formed, the controller controls the moving portion such that the distance satisfies the following Expression (3), $$(Sq2 \times Gp)/Vt > 1.0 \tag{3}$$

where Sq2 represents an area of the tip surface.

5. The three-dimensional forming apparatus according to claim 1, further comprising a material producing portion that includes a flat screw and produces the forming material by melting at least a part of a material to be supplied to the rotating flat screw.

6. The three-dimensional forming apparatus according to claim 1, further comprising a cutting portion that cuts a surface of the forming material that is ejected and cured.

7. A method of forming a three-dimensional object, the method comprising ejecting a forming material from an opening portion of an ejecting portion to form a three-dimensional object, wherein a tip surface is provided at a tip of the ejecting portion, the opening portion having a polygonal external shape from which the forming material is ejected is provided on the tip surface, and the three-dimensional object is formed such that a distance (Gp) between the tip surface and an estimated position to which the forming material is to be ejected from the ejecting portion satisfies the following Expression (4), $$(Sq1 \times Gp)/Vt < 1.0 \tag{4}$$

where Sq1 represents an area of the opening portion, and Vt represents a volume of the forming material that is ejected per unit moving amount by the ejecting portion.

* * * * *